Patented Oct. 28, 1952

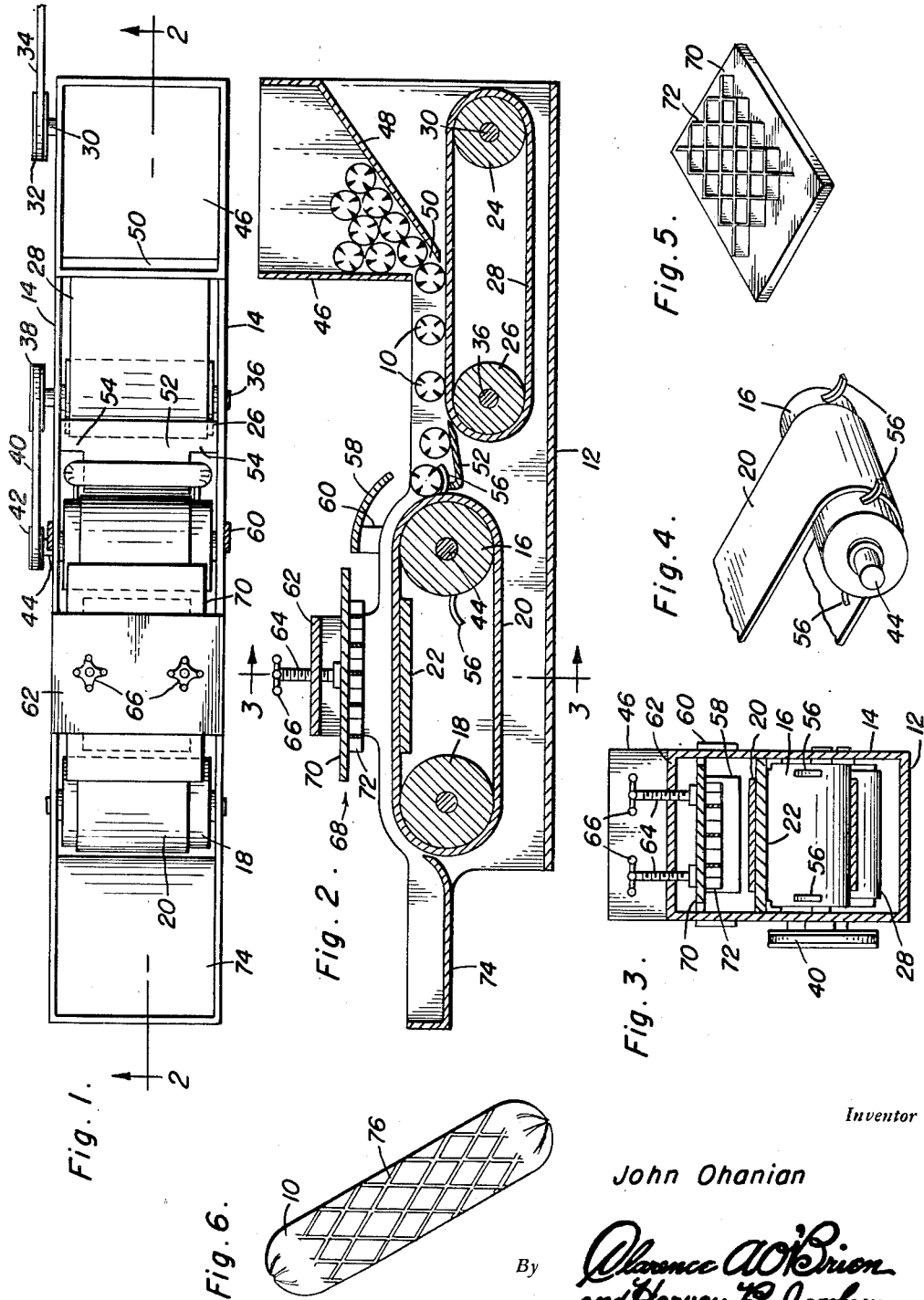

2,615,196

UNITED STATES PATENT OFFICE 2,615,196

DEVICE FOR CUTTING DESIGNS IN FRANKFURTERS

John Ohanian, Binghamton, N. Y.

Application May 12, 1949, Serial No. 92,931

3 Claims. (Cl. 17—27.)

This invention relates generally to food processing machines, and more particularly to a machine for cutting a design in a food product such as a frankfurter.

A primary object of this invention is to provide means for decorating a frankfurter with a design which will be chosen according to individual preferment, the design being placed on the frankfurter in the form of a plurality of cuts positionally related so as to spell out a word or words or to constitute a crisscross design such as that illustrated in the drawing forming a part of this disclosure.

Another object of this invention, ancillary to the preceding object, is to provide means for allowing the escape of expanding gases from the frankfurter when the same is heated during the cooking operation, thus allowing the escape of these gases without rupturing the casing of the frankfurter in an irregular unattractive manner as when the frankfurter splits during the cooking operation.

Yet another object of this invention is to provide means whereby restaurateurs and others may individualize their products with an advertising motif.

Still another object of this invention is to provide means for perforating the casings of frankfurters and the like, which will be quick in operation, and which will be easy to clean and to operate.

And a last object to be mentioned specifically is to provide a device of this character which is relatively inexpensive and practicable to manufacture, which is safe as well as hygienic to operate, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a top plan view of the device, with a plate in front of the cutter removed, so as to disclose underlying parts more clearly;

Figure 2 is a longitudinal vertical sectional view, taken substantially upon the line 2—2 in Figure 1;

Figure 3 is a transverse vertical sectional view, taken substantially upon the line 3—3 in Figure 2;

Figure 4 is a fragmentary perspective view of the drive roller and belt of one of the conveyors drawn to a smaller scale;

Figure 5 is a perspective view of the cutter drawn to a smaller scale; and

Figure 6 is a perspective view of a frankfurter with a design cut therein, as by the machine forming the subject matter of this application and drawn to a larger scale.

Similar characters of reference designate similar or identical elements and portions throughout the specification and throughout the different views in the drawings.

Referring now to the drawings in detail, the machine of this invention is especially adapted to be used in processing the usual frankfurter 10 or similar food product.

The machine includes a frame having a base plate 12 and vertical side plates 14, and a conveyor comprised of a drive roller 16, an idler roller 18 and a belt 20, is mounted within this frame and between the vertical walls 14. The endless belt 20 may be supported at the top and between the rollers 16 and 18 by a plate 22 which is fixed to the frame and disposed transversely of the frame.

A second conveyor is mounted within the frame, at what may be considered the front end of the first mentioned conveyor, and this second conveyor includes a drive roller 24 and a driven roller 26 along with an endless belt 28 entrained over these rollers. It may be here noted that the drive roller 24 is mounted upon a shaft 30 which is disposed transversely of the frame and journaled in the vertical sides 14. This shaft 30 has a drive pulley 32 which will ordinarily be driven by a belt 34, although it will be understood that any suitable drive means for this machine may be provided and this invention is not limited to the particular power drive means indicated symbolically by this belt 34.

Another transverse shaft 36 is similarly mounted in the frame and supports the idler roller 26, and it will be noted that the shaft 36 has a pulley 38 which is connected by means of a belt 40 with a smaller pulley 42 fixed on the end of the drive shaft 44 for the roller 16. It will be clear that the roller 16 will rotate at a faster rate than the rollers 24 and 26.

A hopper 46 is provided on one end of the frame and has a sloping floor 48 leading to a bottom vent 50 which is disposed immediately above the belt 28. It follows, that when the vent 50 is properly proportioned, frankfurters or the like will be dispensed from the hopper onto the belt 28 and will be carried toward a fixed table 52 between the conveyors and extending transversely of the machine to receive the frankfurters individually. This table 52 is supported by laterally extending attachment lugs 54 secured to the side walls 14 of the frame. The roller 16 has diametrically oppositely disposed feeder fingers 56 rigidly mounted thereon and shaped to conform generally with the frankfurters. That is, the feeder fingers are substantially semi-circular and extend radially of the drive roller 16. The feeder fingers 56 are disposed near the ends of the drive roller 16 and the belt 20 runs between these feeder fingers, and these feeder fingers may be thought of as belt guides. It will also be noted that the feeder fingers 56 are positioned beyond the ends of the table 52 and it will be clear how the fingers will pick up individual frankfurters from the table 52 and carry the same onto the belt 20.

A curved plate 58 is supported by means of bracket members 60 on the ends thereof, transversely of the machine and above the drive roller 16, the bracket members 60 being welded or otherwise secured to the side walls 14 of the frame and the curved plate 58 being spaced above the belt 20 a distance comparable to the diameter of a frankfurter or other food product to be processed by the machine. It will be clear that this construction will cause the frankfurter or similar food product to commence a rolling motion before the frankfurter is engaged by the cutter generally indicated by the numeral 68. This cutter 68 is comprised of a plate 70 and knives 72 arranged according to a desired design and having the sharpened edges disposed toward the belt 20. By providing the curved plate 58, the initial rolling action of the frankfurter, prior to its engagement with the cutter 68, will prevent jamming of the machine and will also prevent unduly deep cuts in the casing when the frankfurter first contacts the knives 72. It should be here noted that the frame of the machine will include a yoke 62 comprising a crossbar extending transversely of the machine and integral with the side walls 14 and disposed above these side walls for the support of a pair of set screws 64 which carry the cutter 68. The lower ends of the set screws 64 are rotatably mounted on the plate 70 of the cutter and the set screws are threaded through the crossbar portion of the yoke 62. Hand wheels 66 may be provided on the upper ends of the set screws 64, to facilitate the setting of the knife at the proper distance from the belt 20, according to the size of the units of the food product being processed and the depth of the cut therein desired.

The frankfurters or other food products are delivered from the belt 20 onto a tray 74 which may be integral with the side walls 14 of the frame, and which will, of course, extend from the end of the first mentioned conveyor outwardly in a manner adapting this tray to receive the processed frankfurters.

The operation of this invention will be clearly understood from a consideration of the foregoing description and mechanical details thereof, taken in connection with the above recited objects and the drawings. A design on a processed frankfurter is indicated at 76, and it should again be stated that the character of this design is a matter of individual preference. As before stated the rollers 24 and 26 rotate more slowly than the roller 16 and the belt 28 moves more slowly than the belt 20 so that the frankfurters are fed onto the table 52 at a rate allowing the feeding fingers to feed the frankfurters individually onto the belt 20.

Minor variation from the disclosed embodiment may be made within the scope of the appended claims.

Having described the invention, what is claimed as new is:

1. A machine for cutting a design in a generally cylindrical food product such as a frankfurter, comprising a frame, a conveyor operatively mounted on the frame, and a cutter having knives arranged according to a design and having cutter edges disposed toward said conveyor, said knives being spaced from said conveyor a distance slightly less than the diameter of the food product, said conveyor including an endless belt and pulleys, said belt having a width less than the length of said food product, and one of said pulleys having feeder fingers at the sides of said belt.

2. A machine for cutting a design in a generally cylindrical food product such as a frankfurter, comprising a frame, a conveyor operatively mounted on the frame, and a cutter having knives arranged according to a design and having cutter edges disposed toward said conveyor, said knives being spaced from said conveyor a distance slightly less than the diameter of the food product, said conveyor including an endless belt and pulleys, said belt having a width less than the length of said food product, and one of said pulleys having feeder fingers at the sides of said belt, a hopper, and a second conveyor to carry the food product from the hopper to the first mentioned conveyor.

3. A machine for cutting a design in a generally cylindrical food product such as a frankfurter, comprising a frame, a conveyor operatively mounted on the frame, and a cutter having knives arranged according to a design and having cutter edges disposed toward said conveyor, said knives being spaced from said conveyor a distance slightly less than the diameter of the food product, said conveyor including an endless belt and pulleys, said belt having a width less than the length of said food product, and one of said pulleys having feeder fingers at the sides of said belt, a hopper, a second conveyor to carry the food product from the hopper to the first mentioned conveyor, and a table secured to said frame between said conveyors and having a width equal to the width of said belt.

JOHN OHANIAN.

REFERENCES CITED

The following references are of record in the file of this patent:

UNITED STATES PATENTS

| Number | Name | Date |
|---|---|---|
| 1,086,400 | Richardson | Feb. 10, 1914 |
| 1,402,923 | Dempsey | Jan. 10, 1922 |
| 1,486,288 | Forsyth | Mar. 11, 1924 |
| 2,102,132 | Schmidtke | Dec. 14, 1937 |
| 2,112,798 | West | Mar. 29, 1938 |
| 2,305,553 | Orswell | Dec. 15, 1942 |
| 2,435,224 | Klopfenstein et al. | Feb. 3, 1948 |